United States Patent
Zhao et al.

(10) Patent No.: US 9,537,625 B2
(45) Date of Patent: Jan. 3, 2017

(54) METHOD FOR CALIBRATING DATA SENT BY COORDINATED APS AND BASE STATION

(71) Applicant: ZTE CORPORATION, Shenzhen, Guangdong (CN)

(72) Inventors: Yajun Zhao, Shenzhen (CN); Linmei Mo, Shenzhen (CN); Hanqing Xu, Shenzhen (CN); Yujie Li, Shenzhen (CN); Baoyu Sun, Shenzhen (CN); Chen Huang, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/414,510

(22) PCT Filed: Jun. 27, 2013

(86) PCT No.: PCT/CN2013/078121
§ 371 (c)(1),
(2) Date: Jan. 13, 2015

(87) PCT Pub. No.: WO2013/178120
PCT Pub. Date: Dec. 5, 2013

(65) Prior Publication Data
US 2015/0172014 A1 Jun. 18, 2015

(30) Foreign Application Priority Data
Aug. 13, 2012 (CN) .......................... 2012 1 0286552

(51) Int. Cl.
*H04W 4/00* (2009.01)
*H04L 5/00* (2006.01)
(Continued)

(52) U.S. Cl.
CPC ........... *H04L 5/0035* (2013.01); *H04L 5/0005* (2013.01); *H04L 25/022* (2013.01);
(Continued)

(58) Field of Classification Search
CPC ............. H04W 72/0446; H04W 88/08; H04W 72/0453
See application file for complete search history.

(56) References Cited

U.S. PATENT DOCUMENTS 8,099,132 B2   1/2012   Kim et al.
8,570,988 B2   10/2013  Wallace et al.
(Continued)

FOREIGN PATENT DOCUMENTS

CN   101803229 A   8/2010
CN   102158293 A   8/2011
(Continued)

OTHER PUBLICATIONS

61584014 Provisional Specification.*
(Continued)

*Primary Examiner* — Hassan Phillips
*Assistant Examiner* — Siren Wei
(74) *Attorney, Agent, or Firm* — Brooks Kushman P.C.

(57) ABSTRACT

A method and a base station for calibrating data transmitted by coordinated APs are disclosed. The method includes: a base station obtaining an uplink channel frequency-domain response and a downlink channel frequency-domain response between a first AP and a second AP which participate in coordination; the base station dividing the uplink channel frequency-domain response by the downlink channel frequency-domain response to obtain an uplink and downlink channel response difference between the first AP and the second AP; and the base station calibrating the data transmitted by the first AP and the second AP in coordination according to the uplink and downlink channel response difference. The method and base station in the embodiments of the present document are applied to calibrate the data transmitted by coordinated APs.

4 Claims, 1 Drawing Sheet

(51) Int. Cl.
　　*H04L 25/02* 　　(2006.01)
　　*H04W 88/08* 　　(2009.01)
　　*H04B 7/02* 　　(2006.01)

(52) U.S. Cl.
　　CPC .......... *H04L 25/0204* (2013.01); *H04B 7/024* (2013.01); *H04W 88/08* (2013.01)

(56) References Cited

U.S. PATENT DOCUMENTS

| | | | |
|---|---|---|---|
| 2005/0128953 A1* | 6/2005 | Wallace | H04B 7/0421 370/241 |
| 2009/0073916 A1* | 3/2009 | Zhang | H04B 7/15542 370/315 |
| 2011/0170510 A1* | 7/2011 | Ren | H04L 5/0032 370/329 |
| 2011/0263280 A1 | 10/2011 | Guey | |
| 2012/0302281 A1 | 11/2012 | Takano | |
| 2013/0176934 A1* | 7/2013 | Malladi | H04W 56/001 370/315 |

FOREIGN PATENT DOCUMENTS

| | | |
|---|---|---|
| CN | 102291189 A | 12/2011 |
| WO | 2011122083 A1 | 10/2011 |

OTHER PUBLICATIONS

PCT International Search Report Dated Oct. 3, 2013, Application No. PCT/CN2013/078121, 3 Pages.

Alcatel-Lucent Shanghai Bell, "Antenna Array Calibration for TDD CoMP", 3GPP TSG RAN WG1 Meeting #59bis, R1-100427, Valencia, Spain, Jan. 18-22, 2010, 5 Pages.

Extended European Search Report Dated Jun. 17, 2015, Application No. 13798028.0-1860 / 2860902 PCT/CN2013078121, Applicant ZTE Corporation, 10 Pages.

\* cited by examiner

METHOD FOR CALIBRATING DATA SENT BY COORDINATED APS AND BASE STATION

CROSS-REFERENCE TO RELATED APPLICATIONS

This application is a U.S. national phase of PCT Application No. PCT/CN2013/078121 filed Jun. 27, 2013, which claims priority to Chinese Application No. 201210286552.4 filed Aug. 13, 2012, the disclosures of which are incorporated in their entirety by reference herein.

TECHNICAL FIELD

The present document relates to a technology of Coordinated Multi-Point (CoMP) communications, and in particular, to a method and base station for calibrating data transmitted by coordinated Access Points (APs).

BACKGROUND OF THE RELATED ART

With the continuous improvements of people's requirements on future communications, more attention is paid to the spectrum efficiency of the cell edge, and how to improve the transmission quality and throughput of the cell edge become a research topic. The CoMP technique uses antennas of multiple APs for collaboration of transmission and reception, and one or more APs are set under one base station (cell). The coordinated multiple points in the CoMP may be multiple APs from one cell, or multiple APs from multiple cells, wherein, the cell includes a primary cell and coordinated cells of a terminal. The CoMP can effectively solve the problem of interference at the cell edge, so as to improve the capacity and reliability of the wireless link. Therefore, the CoMP technology, as a key technology, has been introduced into a Long Term Evolution-Advanced (LTE-A) system.

Under a Time Division duplex (TDD) mode of the CoMP system, a problem of antenna calibration between APs needs to be considered. After the antenna calibration is performed independently by the APs themselves, a reciprocity error may exist in an uplink-downlink radio frequency channel of the antenna of the AP, i.e., $H_{DL}=C^*H_{UL}$, wherein, $H_{DL}$ and $H_{UL}$ are frequency-domain responses of a downlink channel and an uplink channel of the antenna of the AP respectively, and C is a complex scalar of an uplink-downlink channel reciprocity error. When Joint Transmission is performed on data between multiple coordinated APs, due to uplink-downlink channel reciprocity errors C of different APs are different, it will cause a phase difference and/or amplitude difference in the data transmitted by the coordinated APs, influence coherent transmission between the coordinated APs, and also influence the system performance. In order to reduce the phase difference and/or amplitude difference in the data transmitted by the coordinated APs, those skilled in the art propose a solution of calibrating transmission of data transmitted by coordinated APs in conjunction using an uplink-downlink channel response difference between the coordinated APs, but has not proposed a method for effectively calculating the uplink-downlink channel response difference between the coordinated APs.

SUMMARY OF THE INVENTION

The embodiments of the present document provide a method and base station for calibrating data transmitted by coordinated APs, to solve the technical problem of how to achieve calibration of data transmitted by the coordinated APs.

The embodiments of the present document provide a method for calibrating data transmitted by coordinated Access Points (APs), comprising:

a base station obtaining an uplink channel frequency-domain response and a downlink channel frequency-domain response between a first AP and a second AP which participate in coordination;

the base station dividing the uplink channel frequency-domain response by the downlink channel frequency-domain response to obtain an uplink-downlink channel response difference between the first AP and the second AP;

and the base station calibrating the data transmitted by the first AP and the second AP in coordination according to the uplink-downlink channel response difference.

Alternatively, the step of a base station obtaining an uplink channel frequency-domain response and a downlink channel frequency-domain response between a first AP and a second AP which participate in coordination comprises:

the base station obtaining a channel frequency-domain response calculated by the second AP at a time t1 according to a calibration sequence received from the first AP, and using the channel frequency-domain response as the downlink channel frequency-domain response between the first AP and the second AP; and the base station obtaining a channel frequency-domain response calculated by the first AP at a time t2 according to a calibration sequence received from the second AP, and using the channel frequency-domain response as the uplink channel frequency-domain response between the first AP and the second AP, wherein, the time t1 is different from the time t2.

Alternatively, the step of a base station obtaining an uplink channel frequency-domain response and a downlink channel frequency-domain response between a first AP and a second AP which participate in coordination comprises:

when the first AP and the second AP have not performed self-calibration of their own set of antennas, if the obtained downlink channel frequency-domain response is calculated by the second AP at the time t1 according to the calibration sequence transmitted by the first AP via an antenna Ant(j) and received by the second AP via an antenna Ant(i), the base station obtaining the uplink channel frequency-domain response calculated by the first AP at the time t2 according to the calibration sequence transmitted by the second AP via the antenna Ant(i) and received by the first AP via the antenna Ant(j); and when the first AP and the second AP have performed self-calibration of their own set of antennas, if the obtained downlink channel frequency-domain response is calculated by the second AP at the time t1 according to the calibration sequence transmitted by the first AP via an antenna Ant(j) and received by the second AP via an antenna Ant(i), the base station obtaining the uplink channel frequency-domain response calculated by the first AP at the time t2 according to the calibration sequence transmitted by the second AP via an antenna Ant(i') and received by the first AP via an antenna Ant(i');

wherein, $i \in [0,N-1], i' \in [0,N-1], j \in [0,N-1], j' \in [0,N-1]$, and N is a number of antennas of the coordinated AP.

Alternatively, the step of the base station dividing the uplink channel frequency-domain response by the downlink channel frequency-domain response to obtain an uplink-downlink channel response difference between the first AP and the second AP comprises:

the base station obtaining multiple uplink channel frequency-domain responses calculated at different times and transmitted by the first AP, and taking a statistic value of the multiple uplink channel frequency-domain responses calculated at different times to participate in calculation of the uplink-downlink channel response difference between the first AP and the second AP; and the base station obtaining multiple downlink channel frequency-domain responses calculated at different times and transmitted by the second AP, and taking a statistic value of the multiple downlink channel frequency-domain responses calculated at different times to participate in calculation of the uplink-downlink channel response difference between the first AP and the second AP.

The embodiments of the present document further provide a base station for calibrating data transmitted by coordinated Access Points (APs), comprising an uplink-downlink channel response difference calculation module and a data calibration module, wherein, the uplink-downlink channel response difference calculation module is configured to obtain an uplink channel frequency-domain response and a downlink channel frequency-domain response between a first AP and a second AP which participate in coordination, divide the uplink channel frequency-domain response by the downlink channel frequency-domain response to obtain an uplink-downlink channel response difference between the first AP and the second AP, and transmit the uplink-downlink channel response difference to the data calibration module; and the data calibration module is configured to calibrate the data transmitted by the first AP and the second AP in coordination according to the uplink-downlink channel response difference.

Alternatively, the uplink-downlink channel response difference calculation module is configured to obtain an uplink channel frequency-domain response and a downlink channel frequency-domain response between a first AP and a second AP which participate in coordination by the following way:

obtaining a channel frequency-domain response calculated by the second AP at a time t1 according to a calibration sequence received from the first AP, and using the channel frequency-domain response as the downlink channel frequency-domain response between the first AP and the second AP; and obtaining a channel frequency-domain response calculated by the first AP at a time t2 according to a calibration sequence received from the second AP, and using the channel frequency-domain response as the uplink channel frequency-domain response between the first AP and the second AP, wherein, the time t1 is different from the time t2.

Alternatively, the uplink-downlink channel response difference calculation module is configured to obtain an uplink channel frequency-domain response and a downlink channel frequency-domain response between a first AP and a second AP which participate in coordination by the following way:

when the first AP and the second AP have not performed self-calibration of their own set of antennas, if the obtained downlink channel frequency-domain response is calculated by the second AP at the time t1 according to the calibration sequence transmitted by the first AP via an antenna Ant(j) and received by the second AP via an antenna Ant(i), obtaining the uplink channel frequency-domain response calculated by the first AP at the time t2 according to the calibration sequence transmitted by the second AP via the antenna Ant(i) and received by the first AP via the antenna Ant(j); and when the first AP and the second AP have performed self-calibration of their own set of antennas, if the obtained downlink channel frequency-domain response is calculated by the second AP at the time t1 according to the calibration sequence transmitted by the first AP via an antenna Ant(j) and received by the second AP via an antenna Ant(i), obtaining the uplink channel frequency-domain response calculated by the first AP at the time t2 according to the calibration sequence transmitted by the second AP via an antenna Ant(j') and received by the first AP via an antenna Ant(i');

wherein, $i \in [0, N-1], i' \in [0, N-1], j \in [0, N-1], j' \in [0, N-1]$, and N is a number of antennas of the coordinated AP.

Alternatively, the uplink-downlink channel response difference calculation module is configured to divide the uplink channel frequency-domain response by the downlink channel frequency-domain response to obtain an uplink-downlink channel response difference between the first AP and the second AP by the following way:

obtaining multiple uplink channel frequency-domain responses calculated at different times and transmitted by the first AP, and taking a statistic value of the multiple uplink channel frequency-domain responses calculated at different times to participate in calculation of the uplink-downlink channel response difference between the first AP and the second AP; and obtaining multiple downlink channel frequency-domain responses calculated at different times and transmitted by the second AP, and taking a statistic value of the multiple downlink channel frequency-domain responses calculated at different times to participate in calculation of the uplink-downlink channel response difference between the first AP and the second AP.

In the above technical schemes, a method for calculating an uplink-downlink channel response difference between coordinated APs is proposed, which provides a possibility of achieving calibration of data transmitted by the coordinated APs according to an uplink-downlink channel response difference between the coordinated APs.

EMBODIMENTS OF THE PRESENT DOCUMENT

The embodiments of the present document will be described in detail below in conjunction with accompanying drawings. It should be illustrated that without conflict, the embodiments in the present application and the features in the embodiments could be combined with each other randomly.

Figure 1:
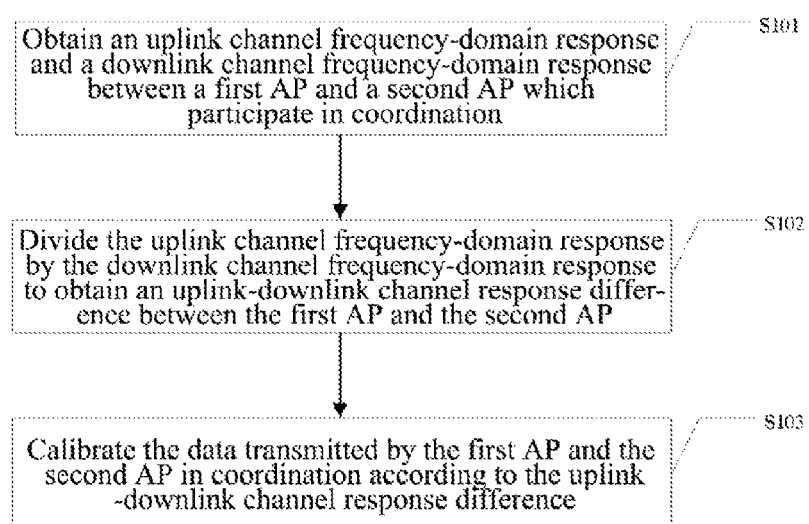
FIG. 1 is a flowchart of a method for calibrating data transmitted by coordinated APs according to an embodiment of the present document.

FIG. 1 is a flowchart of a method for calibrating data transmitted by coordinated APs according to an embodiment of the present document, which comprises the following steps.

In step S101, a base station obtains an uplink channel frequency-domain response and a downlink channel frequency-domain response between a first AP and a second AP which participate in coordination.

The base station obtains a channel frequency-domain response calculated by the second AP at a time t1 according to a calibration sequence received from the first AP, and uses the channel frequency-domain response as the downlink channel frequency-domain response between the first AP and the second AP; and the base station obtains a channel frequency-domain response calculated by the first AP at a time t2 according to a calibration sequence received from the second AP, and uses the channel frequency-domain response as the uplink channel frequency-domain response between the first AP and the second AP, wherein the time t1 is different from the time t2;

when the first AP and the second AP have not performed self-calibration of their own set of antennas, if the obtained downlink channel frequency-domain response is calculated by the second AP at the time t1 according to the calibration sequence transmitted by the first AP via an antenna Ant(j) and received by the second AP via an antenna Ant(i), the base station obtains the uplink channel frequency-domain response calculated by the first AP at the time t2 according to the calibration sequence transmitted by the second AP via the antenna Ant(i) and received by the first AP via the antenna Ant(j); and when the first AP and the second AP have performed self-calibration of their own set of antennas, if the obtained downlink channel frequency-domain response is calculated by the second AP at the time t1 according to the calibration sequence transmitted by the first AP via an antenna Ant(j) and received by the second AP via an antenna Ant(i), the base station obtains the uplink channel frequency-domain response calculated by the first AP at the time t2 according to the calibration sequence transmitted by the second AP via an antenna Ant(j') and received by the first AP via an antenna Ant(i');

wherein, $i \in [0, N-1], i' \in [0, N-1], j \in [0, N-1], j' \in [0, N-1]$, and N is a number of antennas of the coordinated AP.

In step S102, the base station divides the uplink channel frequency-domain response by the downlink channel frequency-domain response to obtain an uplink-downlink channel response difference between the first AP and the second AP.

In order to smooth the influence due to the channel fluctuation, the base station may obtain multiple uplink channel frequency-domain responses calculated at different times and transmitted by the first AP, and take a statistic value of the multiple uplink channel frequency-domain responses calculated at different times to participate in calculation of the uplink-downlink channel response difference between the first AP and the second AP; and obtain multiple downlink channel frequency-domain responses calculated at different times and transmitted by the second AP, and take a statistic value of the multiple downlink channel frequency-domain responses calculated at different times to participate in calculation of the uplink-downlink channel response difference between the first AP and the second AP.

In S103, the base station calibrates the data transmitted by the first AP and the second AP in coordination according to the uplink-downlink channel response difference.

The phase calibration or amplitude calibration may be performed on the data transmitted by the first AP and the second AP in coordination according to the uplink-downlink channel response difference, or both the phase calibration and amplitude calibration may be performed at the same time on the data transmitted by the first AP and the second AP in coordination according to the uplink-downlink channel response difference.

The above embodiments will be further described below by way of a specific application example.

Assume that there are two access points AP1 and AP2 each having a set of antennas, and a number of antennas is N. The AP1 and AP2 have performed self-calibration of their own set of antennas.

In step one, at time t1, AP1 selects an antenna (for example, a first antenna Ant(0)) to transmit a calibration sequence, and AP2 selects an antenna (for example, a first antenna Ant(0)) to receive the calibration sequence and estimates a channel frequency-domain response H(t1) at the time t1, which may be expressed as:

$$H(t1) = H_{AP1DL}^{RF}(t1) * H_0(t1) * H_{AP2UL}^{RF}(t1)$$
$$= C_{AP1}(t1) * H_{AP1UL}^{RF}(t1) * H_0(t1) * H_{AP2UL}^{RF}(t1);$$

wherein, $H_{AP1DL}^{RF}(t1)$ represents a channel frequency-domain response corresponding to a downlink radio frequency channel of the antenna Ant(0) of AP1 at the time t1;

$H_{AP1UL}^{RF}(t1)$ represents a channel frequency-domain response corresponding to an uplink radio frequency channel of the antenna Ant(0) of AP1 at the time t1;

$C_{AP1}(t1)$ represents a ratio of channel frequency-domain responses corresponding to the uplink radio frequency channel and the downlink radio frequency channel of the antenna Ant(0) of AP1 at the time t1;

$H_0(t1)$ represents a channel response of a radio air interface part from the antenna Ant(0) of AP1 to the antenna Ant(0) of AP2 at the time t1, which does not include radio frequency channel parts of the antennas of the two APs; and $H_{AP2UL}^{RF}(t1)$ represents a channel frequency-domain response corresponding to the uplink radio frequency channel of the antenna Ant(0) of AP2 at the time t1.

In step two, at time t2, AP2 selects an antenna (for example, the first antenna Ant(0)) to transmit a calibration sequence, and AP1 selects an antenna (for example, the first antenna Ant(0)) to receive the calibration sequence and estimates a channel frequency-domain response H(t2), which may be expressed as:

$$H(t2) = H_{AP2DL}^{RF}(t2) * H_0(t2) * H_{AP1UL}^{RF}(t2)$$
$$= C_{AP2}(t2) * H_{AP2UL}^{RF}(t2) * H_0(t2) * H_{AP1UL}^{RF}(t2);$$

wherein, $H_{AP2DL}^{RF}(t2)$ represents a channel frequency-domain response corresponding to a downlink radio frequency channel of the antenna Ant(0) of AP2 at the time t2;

$H_{AP2UL}^{RF}(t2)$ represents a channel frequency-domain response corresponding to an uplink radio frequency channel of the antenna Ant(0) of AP2 at the time t2;

$C_{AP2}(t2)$ represents a ratio of channel frequency-domain responses corresponding to the uplink radio frequency channel and the downlink radio frequency channel of the antenna Ant(0) of AP2 at the time t2;

$H_0(t2)$ represents a channel response of a radio air interface part from the antenna Ant(0) of AP2 to the antenna Ant(0) of AP1 at the time t2, which does not include radio frequency channel parts of the antennas of the two APs; and $H_{AP1UL}^{RF}(t2)$ represents a channel frequency-domain response corresponding to the uplink radio frequency channel of the antenna Ant(0) of AP1 at the time t2.

In step three, the base station obtains channel frequency-domain response H(t1) and H(t2) measured by the two APs based on times t1 and t2, to estimate an uplink-downlink channel response difference between the two APs, which may be expressed as:

$$\Delta C = \frac{H(t1)}{H(t2)}$$
$$= \frac{C_{AP1}(t1) * H_{AP1UL}^{RF}(t1) * H_0(t1) * H_{AP2UL}^{RF}(t1)}{C_{AP2}(t2) * H_{AP2UL}^{RF}(t2) * H_0(t2) * H_{AP1UL}^{RF}(t2)};$$

wherein, if the channels at the time t1 and the time t2 do not change, or a change error of the channels is small, $H_{AP1UL}^{RF}(t1)*H_0(t1)*H_{AP2UL}^{RF}(t1) \approx H_{AP2UL}^{RF}(t2)*H_0(t2)*H_{AP1UL}^{RF}(t2)$, and the uplink-downlink channel response difference between the two APs is approximately:

$$\Delta C = \frac{H(t1)}{H(t2)} \approx \frac{C_{AP1}(t1)}{C_{AP2}(t2)};$$

In order to ensure that the channels at the time t1 and the time t2 do not change or a change error of the channels is small, the time t1 is close to the time t2 as much as possible.

In step four, the base station calibrates the transmission of data transmitted by the two APs in conjunction according to the uplink-downlink channel response difference $\Delta C$ between the two APs calculated in step three.

Figure 2:
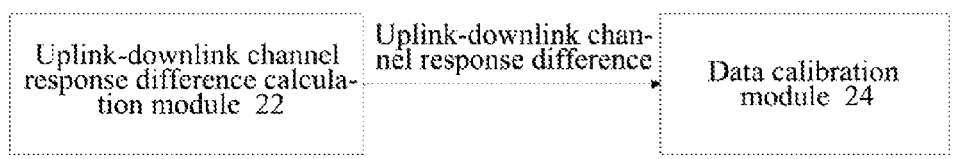
FIG. 2 is a modular diagram of a base station for calibrating data transmitted by coordinated APs according to an embodiment of the present document.

FIG. 2 is a modular diagram of a base station for calibrating data transmitted by coordinated APs according to an embodiment of the present document.

The base station includes an uplink-downlink channel response difference calculation module 22 and a data calibration module 24, wherein, the uplink-downlink channel response difference calculation module 22 is configured to obtain an uplink channel frequency-domain response and a downlink channel frequency-domain response between a first AP and a second AP which participate in coordination, and divide the uplink channel frequency-domain response by the downlink channel frequency-domain response to obtain an uplink-downlink channel response difference between the first AP and the second AP, and transmit the uplink-downlink channel response difference to the data calibration module 24.

The uplink-downlink channel response difference calculation module 22 may be configured to obtain an uplink channel frequency-domain response and a downlink channel frequency-domain response between a first AP and a second AP which participate in coordination by the following way:

obtaining a channel frequency-domain response calculated by the second AP at a time t1 according to a calibration sequence received from the first AP, and using the channel frequency-domain response as the downlink channel frequency-domain response between the first AP and the second AP; and obtaining a channel frequency-domain response calculated by the first AP at a time t2 according to a calibration sequence received from the second AP, and using the channel frequency-domain response as the uplink channel frequency-domain response between the first AP and the second AP, wherein, the time t1 is different from the time t2.

The uplink-downlink channel response difference calculation module 22 may be configured to obtain an uplink channel frequency-domain response and a downlink channel frequency-domain response between a first AP and a second AP which participate in coordination by the following way:

when the first AP and the second AP have not performed self-calibration of their own set of antennas, if the obtained downlink channel frequency-domain response is calculated by the second AP at the time t1 according to the calibration sequence transmitted by the first AP via an antenna Ant(j) and received by the second AP via an antenna Ant(i), obtaining the uplink channel frequency-domain response calculated by the first AP at the time t2 according to the calibration sequence transmitted by the second AP via the antenna Ant(i) and received by the first AP via the antenna Ant(j); and when the first AP and the second AP have performed self-calibration of their own set of antennas, if the obtained downlink channel frequency-domain response is calculated by the second AP at the time t1 according to the calibration sequence transmitted by the first AP via an antenna Ant(j) and received by the second AP via an antenna Ant(i), obtaining the uplink channel frequency-domain response calculated by the first AP at the time t2 according to the calibration sequence transmitted by the second AP via an antenna Ant(j') and received by the first AP via an antenna Ant(i');

wherein, $i \in [0,N-1], i' \in [0,N-1], j \in [0,N-1], j' \in [0,N-1]$, and N is a number of antennas of the coordinated AP.

The uplink-downlink channel response difference calculation module 22 may be configured to divide the uplink channel frequency-domain response by the downlink channel frequency-domain response to obtain an uplink-downlink channel response difference between the first AP and the second AP by the following way:

obtaining multiple uplink channel frequency-domain responses calculated at different times and transmitted by the first AP, and taking a statistic value of the multiple uplink channel frequency-domain responses calculated at different times to participate in calculation of the uplink-downlink channel response difference between the first AP and the second AP; and obtaining multiple downlink channel frequency-domain responses calculated at different times and transmitted by the second AP, and taking a statistic value of the multiple downlink channel frequency-domain responses calculated at different times to participate in calculation of the uplink-downlink channel response difference between the first AP and the second AP.

The data calibration module 24 is configured to calibrate the data transmitted by the first AP and the second AP in coordination according to the uplink-downlink channel response difference.

A person having ordinary skill in the art can understand that all or a part of steps in the above method can be implemented by programs instructing related hardware, and the programs can be stored in a computer readable storage medium, such as a read-only memory, disk or disc etc. Alternatively, all or a part of steps in the above embodiments can also be implemented by one or more integrated circuits. Accordingly, each module/unit in the above embodiments can be implemented in a form of hardware, or can also be implemented in a form of software functional module. The embodiments of the present document are not limited to any particular form of a combination of hardware and software.

It should be noted that, the present document can also have a plurality of other embodiments. Those skilled in the related art can make various corresponding modifications and variations according to the embodiments of the present document, without departing from the spirit and essence thereof of the present document, while all these corresponding modifications and variations should belong to the protection scope of the appended claims of the present document.

INDUSTRIAL APPLICABILITY

In the above technical schemes, a method for calculating an uplink-downlink channel response difference between coordinated APs is proposed, which provides a possibility of achieving calibration of data transmitted by the coordinated APs according to an uplink-downlink channel response difference between the coordinated APs.

What is claimed is:

1. A method for calibrating data transmitted by coordinated Access Points (APs), comprising:
    a base station obtaining an uplink channel frequency-domain response and a downlink channel frequency-domain response between a first AP and a second AP which participate in coordination;
    the base station dividing the uplink channel frequency-domain response by the downlink channel frequency-domain response to obtain an uplink-downlink channel response difference between the first AP and the second AP; and
    the base station calibrating the data transmitted by the first AP and the second AP in coordination according to the uplink-downlink channel response difference;
    wherein the step of the base station obtaining the uplink channel frequency-domain response and the downlink channel frequency-domain response between the first AP and the second AP which participate in coordination comprises:
    the base station obtaining a channel frequency-domain response calculated by the second AP at a time t1 according to a calibration sequence received from the first AP, and using the channel frequency-domain response as the downlink channel frequency-domain response between the first AP and the second AP;
    the base station obtaining a channel frequency-domain response calculated by the first AP at a time t2 according to a calibration sequence received from the second AP, and using the channel frequency-domain response as the uplink channel frequency-domain response between the first AP and the second AP;
    when the first AP and the second AP have not performed self-calibration of their own set of antennas, if the obtained downlink channel frequency-domain response is calculated by the second AP at the time t1 according to the calibration sequence transmitted by the first AP via an antenna Ant(j) and received by the second AP via an antenna Ant(i), the base station obtaining the uplink channel frequency-domain response calculated by the first AP at the time t2 according to the calibration sequence transmitted by the second AP via the antenna Ant(i) and received by the first AP via the antenna Ant(j), and
    when the first AP and the second AP have performed self-calibration of their own set of antennas, if the obtained downlink channel frequency-domain response is calculated by the second AP at the time t1 according to the calibration sequence transmitted by the first AP via an antenna Ant(j) and received by the second AP via an antenna Ant(i), the base station obtaining the uplink channel frequency-domain response calculated by the first AP at the time t2 according to the calibration sequence transmitted by the second AP via an antenna Ant(j') and received by the first AP via an antenna Ant(i');
    wherein i∈[0,N−1], i'∈[0,N−1], j∈[0,N−1], j'∈[0,N−1], the time t1 is different from the time t2, and N is a number of antennas of the coordinated AP.

2. The method according to claim 1, wherein, the step of the base station dividing the uplink channel frequency-domain response by the downlink channel frequency-domain response to obtain the uplink-downlink channel response difference between the first AP and the second AP comprises:
    the base station obtaining multiple uplink channel frequency-domain responses calculated at different times and transmitted by the first AP, and taking a statistic value of the multiple uplink channel frequency-domain responses calculated at different times to participate in calculation of the uplink-downlink channel response difference between the first AP and the second AP; and
    the base station obtaining multiple downlink channel frequency-domain responses calculated at different times and transmitted by the second AP, and taking a statistic value of the multiple downlink channel frequency-domain responses calculated at different times to participate in calculation of the uplink-downlink channel response difference between the first AP and the second AP.

3. A base station for calibrating data transmitted by coordinated Access Points (APs), comprising a processor, and a storage device for storing computer executable instructions that when executed by the processor cause the processor to perform steps in an uplink-downlink channel response difference calculation module and a data calibration module, wherein,
    the uplink-downlink channel response difference calculation module is configured to obtain an uplink channel frequency-domain response and a downlink channel frequency-domain response between a first AP and a second AP which participate in coordination, divide the uplink channel frequency-domain response by the downlink channel frequency-domain response to obtain an uplink-downlink channel response difference between the first AP and the second AP, and transmit the uplink-downlink channel response difference to the data calibration module; and
    the data calibration module is configured to calibrate the data transmitted by the first AP and the second AP in coordination according to the uplink-downlink channel response difference;
    wherein the uplink-downlink channel response difference calculation module is configured to obtain the uplink channel frequency-domain response and the downlink channel frequency-domain response between the first AP and the second AP, which participate in coordination, by the following way:
    obtaining a channel frequency-domain response calculated by the second AP at a time t1 according to a calibration sequence received from the first AP, and using the channel frequency-domain response as the downlink channel frequency-domain response between the first AP and the second AP;
    obtaining a channel frequency-domain response calculated by the first AP at a time t2 according to a calibration sequence received from the second AP, and using the channel frequency-domain response as the uplink channel frequency-domain response between the first AP and the second AP;

when the first AP and the second AP have not performed self-calibration of their own set of antennas, if the obtained downlink channel frequency-domain response is calculated by the second AP at the time t1 according to the calibration sequence transmitted by the first AP via an antenna Ant(j) and received by the second AP via an antenna Ant(i), obtaining the uplink channel frequency-domain response calculated by the first AP at the time t2 according to the calibration sequence transmitted by the second AP via the antenna Ant(i) and received by the first AP via the antenna Ant(j); and when the first AP and the second AP have performed self-calibration of their own set of antennas, if the obtained downlink channel frequency-domain response is calculated by the second AP at the time t1 according to the calibration sequence transmitted by the first AP via an antenna Ant(j) and received by the second AP via an antenna Ant(i), obtaining the uplink channel frequency-domain response calculated by the first AP at the time t2 according to the calibration sequence transmitted by the second AP via an antenna Ant(j') and received by the first AP via an antenna Ant(i');

wherein $i \in [0,N-1]$, $i' \in [0,N-1]$, $j \in [0,N-1]$, $j' \in [0,N-1]$, the time t1 is different from the time t2, and N is a number of antennas of the coordinated AP.

4. The base station according to claim 3, wherein, the uplink-downlink channel response difference calculation module is configured to divide the uplink channel frequency-domain response by the downlink channel frequency-domain response to obtain the uplink-downlink channel response difference between the first AP and the second AP by the following way:

obtaining multiple uplink channel frequency-domain responses calculated at different times and transmitted by the first AP, and taking a statistic value of the multiple uplink channel frequency-domain responses calculated at different times to participate in calculation of the uplink-downlink channel response difference between the first AP and the second AP; and obtaining multiple downlink channel frequency-domain responses calculated at different times and transmitted by the second AP, and taking a statistic value of the multiple downlink channel frequency-domain responses calculated at different times to participate in calculation of the uplink-downlink channel response difference between the first AP and the second AP.

* * * * *